(12) United States Patent
Spittle

(10) Patent No.: US 7,854,926 B2
(45) Date of Patent: Dec. 21, 2010

(54) BIOLOGICAL SOIL NUTRIENT SYSTEM

(75) Inventor: Kevin S. Spittle, Vero Beach, FL (US)

(73) Assignee: Profile Products L.L.C., Buffalo Grove, IL (US)

( * ) Notice: Subject to any disclaimer, the term of this patent is extended or adjusted under 35 U.S.C. 154(b) by 839 days.

(21) Appl. No.: 11/619,831

(22) Filed: Jan. 4, 2007

(65) Prior Publication Data

US 2008/0163658 A1     Jul. 10, 2008

(51) Int. Cl.
| | |
|---|---|
| *A01N 3/02* | (2006.01) |
| *A01N 59/00* | (2006.01) |
| *A01N 63/00* | (2006.01) |
| *A01N 63/04* | (2006.01) |
| *A01N 65/00* | (2009.01) |
| *C12N 1/00* | (2006.01) |
| *C12N 11/00* | (2006.01) |
| *C12N 11/14* | (2006.01) |
| *C12N 1/20* | (2006.01) |

(52) U.S. Cl. .................. 424/93.4; 424/93.3; 424/93.46; 424/93.5; 435/174; 435/176; 435/252.4; 435/252.5; 435/254.1; 504/113; 504/117; 504/119

(58) Field of Classification Search ....................... None
See application file for complete search history.

(56) References Cited

U.S. PATENT DOCUMENTS

| | | | |
|---|---|---|---|
| 4,551,165 A | 11/1985 | Warner | |
| 5,147,441 A | 9/1992 | Megeed | |
| 5,447,866 A | 9/1995 | Runyon | |
| 6,331,300 B1 * | 12/2001 | Dybas et al. | ............... 424/93.4 |

\* cited by examiner

*Primary Examiner*—Deborah K. Ware
(74) *Attorney, Agent, or Firm*—Brooks Kushman P.C.

(57) ABSTRACT

A biological soil nutrient system that combines beneficial soil fungi and bacteria in a growth promoting nutrient medium, embedded in an inorganic porous ceramic particle for direct delivery during soil aerification to the rhizosphere of adventitious plants, including sports turf, landscape and agricultural applications.

14 Claims, 1 Drawing Sheet

BIOLOGICAL SOIL NUTRIENT SYSTEM

BACKGROUND OF THE INVENTION

1. Field of the Invention

The invention relates to biological soil treatment products which improve the soil biology of adventitious plants and a method for delivery directly to the plant root systems.

2. Description of Related Art

Biological soil treatments are currently marketed in a dry powder or solution for preparing soil beds prior to installation of sod, golf course greens and sports turf. The benefits of these biological soil treatments are generally realized only when positioned under the sod or established turf, allowing the use of insecticides, herbicides and fungicides on the laid sod that will not affect the soil treatment.

However, use of biological soil treatments is limited in that once the sod/grass is established, there is no efficient way to reach the roots to treat large areas, or to innoculate areas that did not receive an effective amount of the biological soil treatment formula. In order to ensure a sufficient amount, the tendency is to over-innoculate rather than under innoculate the soil in preparation for laying sod/turf, greatly increasing the expense of the soil treatment.

In particular, U.S. Pat. No. 5,147,441 entitled "Biological Product for Soil Improvement and Method of Application to Soil" issued Sep. 15, 1992, discloses a soil treatment formula which includes adding a nitrogen-fixing *Azospirillum* species of bacteria to the soil treatment formulation and increasing the cellulosic content to feed the bacteria. In general, these soil treatment formulas are created by experimentation with different bacteria, fungi and nutrients in varying concentrations to determine which combination will work best with the desired plant type and whether used for planting from seed or sod. In particular, during golf course turf construction, on U.S. Golf Association (USGA sand based greens, there are inadequate levels of soil organisms, this fact contributes to nutrient leaching and poor utilization of plant nutrients.

Currently, the different biological soil treatments are sold commercially as a dry mixture and have a tendency to separate by size over time, essentially requiring greater amounts of the mixture be used to ensure proper soil nutrient management. Examples of these mixtures include, Mycor Turf Saver (Plant Health Care, Pittsburgh, Pa.) and Soil Innoculums (Soil Life Co., Oregon City, Oreg.). These formulations generally contain microbes, fungal spores, and organic nutrients for the plants as well as the developing fungi and bacteria. These dry soil treatments are generally delivered to the soil prior to laying down sod or grass seed using a drop spreader with a tiller which generally results in a 10-15% loss of product during soil inoculation due to wind. Many vendors recommend immediately wetting the soil after inoculation to reduce the amount blown away. Biological soil treatment formulations when prepared in solution generally have a reduced shelf life and require adequate mixing to ensure delivery of the appropriate concentration of the soil treatment.

The narrow region of soil that is directly influenced by the root secretions and associated with soil microorganism is defined as the rhizosphere. In addition, the soil treatments containing microorganisms may be undermined by nematodes and arthropods which feed on the soil bacteria and fungi and limit their effective lifespan. These predators are generally controlled with pesticides which selectively kill the nematodes and arthropods and allow the soil bacteria and fungi to form symbiotic relationships with the plant and facilitate food, water and air usage by the plant's root systems. When the environment is conducive, a higher biological activity significantly reduces nutrient leaching, the majority of plant nutrients are made available to plants via these microorganisms.

Landscapers, greens keepers and sports grounds keepers look for the most cost-effective way to maintain large acres of sports turf, grass and landscapes. They search for the best methods for soil preparation prior to laying new turf and when a soil treatment fails, it is costly to replace these entire areas of dead sod. Therefore, there is a need in the industry to overcome the problem of delivery of biological soil treatments to mature, stable lawns, sports turf and landscaping without disturbing or replacing the sod surface. There is also a need for an improved system of direct delivery of biological soil treatments to the rhizosphere of the root systems with minimal loss of product. A rhizosphere containing an appropriate mixture of biological soil nutrients promotes nourishment and growth of the root systems.

U.S. Pat. No. 4,551,165 entitled "Mycorrhizal Seed Pellets" issued Nov. 5, 1985 (expired) utilized a soil treatment formulation containing the *Glomus* fungal species which is then embedded in peat moss with the desired seed to form a seed pellet, however it does not include a beneficial bacteria in the formulation. The patent claims that peat moss is superior to clay or sand due to the moisture and nutrient requirements of the seeds.

There are several ways to innoculate the soil with root treatments, including manual soil penetration methods to deliver the biological soil treatments, automated soil penetration equipment or subterranean piping such as an irrigation system. U.S. Pat. No. 5,447,866 entitled "Reactor for Microorganisms and Feed Device Therefore" filed Sep. 5, 1995, discloses a device to take dry soil treatment components, mix with nutrients in a growth media connected to an irrigation system for direct treatment of the soil. However, these types of irrigation systems are more conducive to agricultural crops and are not cost effective for sports arenas and golf courses.

Therefore, there exists a need in the grounds maintenance industry for a biological soil nutrient system which allows application prior to and after sod, turf and greens installation. There also exists a need to rapidly deliver such nutrient systems over large acres of golf greens and sports turf without a rapid turnaround time for their intended use.

SUMMARY OF THE INVENTION

The invention pertains to a biological soil treatment composition and method for manufacture of porous ceramic particles containing the biological soil treatment composition. The invention also pertains to a method for delivery of the treated porous ceramic particles to the desired plant rhizosphere for successful soil treatment. These improvements in soil nutrient management are facilitated by a biological soil treatment composition, which primarily provides beneficial bacteria and fungi. The microorganisms form symbiotic rhizomes on the roots system to facilitate food and water usage by the plant.

Second, carbohydrates and other food sources for the dormant bacteria and fungi are included to increase the colony forming of the organisms. Third, a porous ceramic particle, which protects the biological soil treatment from wind and water erosion and, due to its size, reduces loss of the soil treatment from the treated area. This protection has been shown to facilitate the significant increase in biological activity of the microorganism.

And finally, the invention provides a delivery system, which directly injects the biological soil treatment system, into the rhizosphere of the root systems of newly laid sod, mature sports turf and landscaping areas, specifically, utilizing a soil aeration apparatus similar to the DryJect™ system (DryJect Manufacturing, LLC in Hatboro, Pa., wholely owned by Profile Products, LLC.).

The biological soil treatment composition may be mixed with sand or soil in a dry form at up to one third by volume and delivered to the planting site as the growing medium for applications which may include golf course construction, installation of flower beds as well as treatment of growing lawns, flower beds, shrubs and vegetable producing gardens. The composition should also be considered for use where required to reduce nutrient leaching from the soil profile.

DETAILED DESCRIPTION OF THE PREFERRED EMBODIMENT(S)

1. Biological Soil Treatment Composition

Figure 1:
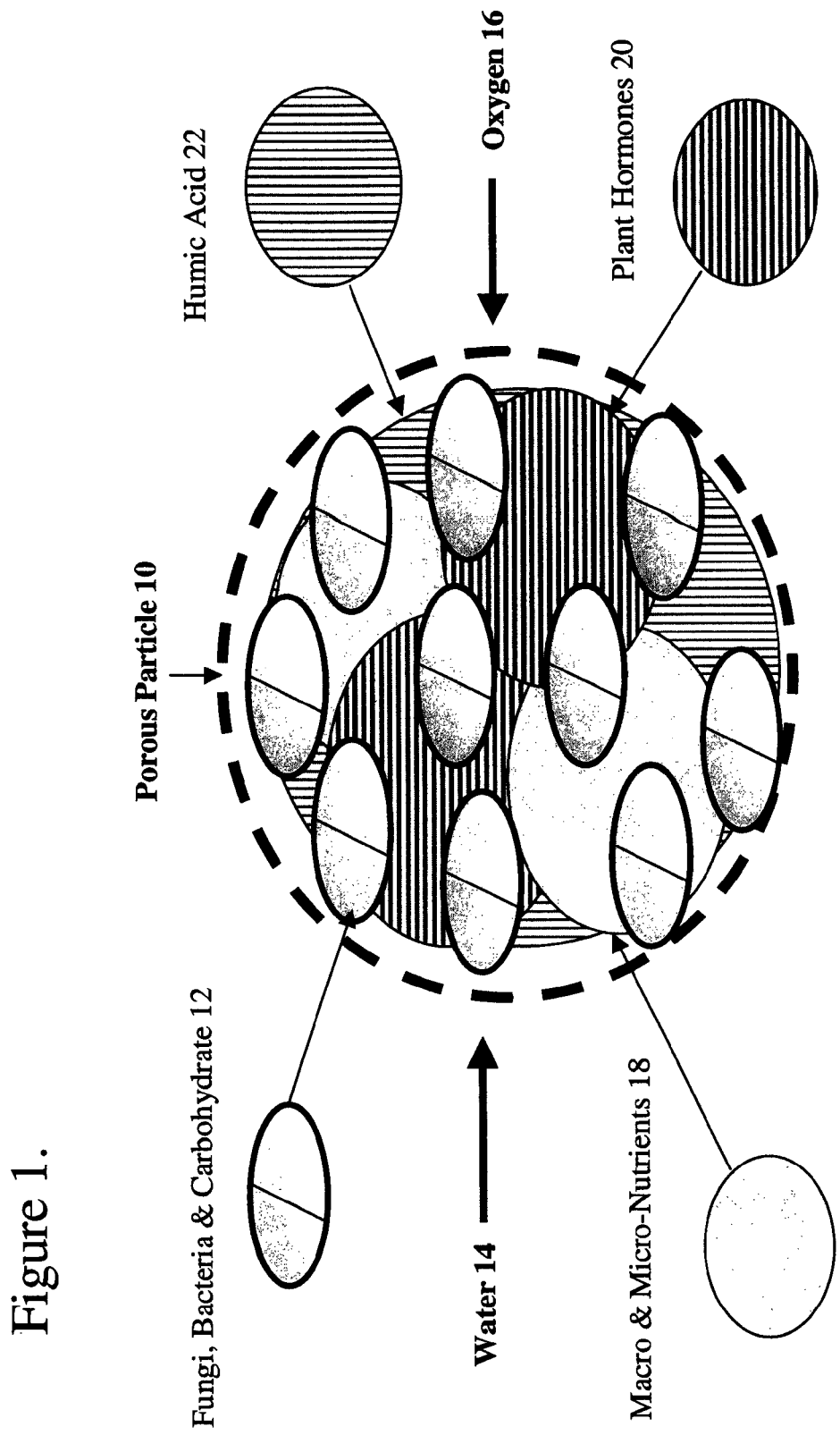
FIG. 1 is a diagram of a biological soil treatment composition.

In an embodiment of a biological soil treatment containing the symbiotic *Glomus* fungal species, the symbiotic *Bacillus* bacterial species and a carbohydrate food source 12 are combined in an effective concentration with a porous particle 10, wherein the target host is a plant root system as illustrated in FIG. 1. In a variation of present embodiment, the porous particles are a porous ceramic particle. Suitable porous particles include those commercially available as Profile Porous Ceramic particles by Profile Products, LLC of Buffalo Grove, Ill. These porous ceramic particles are clay-based montmorillonite particles mined from Blue Mountain, Miss. and fired to 1000° C. to make a porous ceramic particle. The Profile Porous Ceramic particles were originally developed to be an inorganic soil treatment to preserve water 14 and oxygen 16 flow to plant root systems in easily compacted soil. In a refinement of the present embodiment, the particles porosity is from 60 to 90 volume percent. In another variation, the particles porosity is from 64 to 85 volume percent. They are generally dispensed in a bulk density of 945 pounds per cubic yard.

However, due to the natural porosity of this clay-based ceramic particle, when mixed with a biological soil treatment the dormant organisms, nutrients, and growth media become embedded within the pores of the ceramic particle. In one variation, the microorganisms when combined with the porous ceramic particles are mixed in a range of approximately 0.01%-20% by weight of porous ceramic particles. In a refinement of this embodiment, the microorganisms are combined with the porous ceramic particles in a range of approximately 0.10%-3.0% by weight of porous ceramic particles. The porous ceramic particles provide protection to the microorganisms from wind, water erosion and increases the amount of biological soil treatment available to the plant root systems.

The biological soil treatment composition may comprise endomycorrhizial and ectomycorrhizial symbiotic fungi, a symbiotic bacteria and beneficial nutrients for the soil, nutrients for the plants and nutrients for the biological species including a carbohydrate source, in particular, a starch. The preferred biological soil treatment composition contains endomycorrhizial fungi, specifically, *Glomus intraradices*, *Glomus mosseae*, *Glomus aggregatum* and *Glomus etunicatum*, or a mixture thereof. These species have the ability to attach to root systems in a symbiotic relationship or form spores and thus survive during a long winter. The preferred symbiotic soil bacteria from the *Bacillus* species which are also spore formers include, *Bacillus licheniformis*, *Bacillus megaterium*, *Bacillus oleronius*, *Bacillus pumilis*, *Marinibacillus marinus* (formerly *Bacillus marinus*) and *Paenibacillus lentimorbus* (formerly *Bacillus lentimorbus*), or a mixture thereof.

The biological organisms may be grown separately, in organism-specific media, as to species *Bacillus* or *Glomus* or grown in generic media promoting growth for both the fungi and bacteria. The preferred embodiment may utilize organisms purchased in a liquid bath which controls dormancy. Alternatively, these organisms may be purchased in a dried, freeze dried or frozen state, mixed in the desired combination and directly added to the biological soil treatment composition.

The composition also contains soil and plant macro-nutrients and micro-nutrients 18 as well as biological nutrients to promote the growth and development of the fungi and bacteria. A carbohydrate is added to the organism's liquid bath. The plant nutrients include plant hormones 20, such as auxins and cytokinins. The soil/plant nutrients may include phosphorous, nitrogen and potassium. Other nutrients may also include agents such as humic acid 22. These nutrients may be lost over time due to improper fertilization. The micro-nutrients are chosen to promote a rich environment for the root systems and these choices must be balanced with an environment favorable to the biological organisms. Although other components may be included, a preferred biological soil treatment composition is listed in Table 1.

TABLE 1

| Biological Soil Nutrient Composition Ingredients |
| --- |
| *Glomus* species |
| *Bacillus* species |
| Soil/Plant Macro-Nutrients: Phosphorous, nitrogen, calcium, magnesium, sulfur and/or potassium; and plant hormones, including auxins and cytokinins |
| Soil/Plant Micro-Nutrients: Manganese, iron, boron, zinc, copper, molybdenum and/or chlorine |
| Biological Nutrients: Carbohydrates, i.e. starch |
| Other Nutrients: Biostimulants, including Humic acid |

The biological soil treatment composition is used to impregnate the porous ceramic particle 10, which contain pores and channels which will provide a natural biological environment for the delivery and development of the microorganisms.

The porous ceramic particle 10 provides a delivery vehicle for optimum placement of the microorganisms close to the root system and due to its size retains its location in the soil. This method of root treatment is superior to soil treatment compositions commercially available as powders and sprays, which may be easily diluted and washed deeper into the soil away from the root systems.

2. Method of Manufacture

The preferred method of preparation is by spraying the porous particles with the biological soil treatment composition. The particles have a zero to 4% moisture content, which promotes absorption of the soil treatment composition into the particle pore space. The maximum particle moisture content is 10% to ensure the organisms remain dormant. Moisture content greater than 14% is required to activate the growth cycle of the dormant organisms. The clay-based porous ceramic particles or other porous particles may be processed by treatment with the biological soil composition to form a biological soil nutrient system. Once the biological soil nutrient system is mixed with soil and hydrated the microorganisms become active. Other porous particles include perlite, vermiculite or other particles containing pore spaces capable of holding both water and air. The treated particles may then be stored dry under a wide range of temperatures up to 100° F. packaged in bags of 5 to 50 pounds each, or as required for commercial use.

The containers are preferably sealed to reduce personnel coming in contact with spores and microorganisms when handling the materials. USDA labeling will be determined by species and MSDS recommendations.

3. Method of Delivery of Biological Soil Nutrient System

In the field of soil biology, aeration of the soil is necessary for successful growth of plants by ensuring the root systems have adequate access to air and water. The grounds maintenance industry utilize different types of equipment to promote aeration of the soil. An industry leader in the field of grounds maintenance developed the DryJect™ system which is manufactured by DryJect Manufacturing, LLC in Hatboro, Pa., a Profile Products, LLC company. This hydro injection system is utilized to relieve soil compaction which stifles root systems and reduce standing water on the surface of the lawn and/or turf. The DryJect™ equipment uses water to fracture the soil with the capability of simultaneously injecting large volumes of dry fertilizers, inorganic soil treatments and pesticides that allow golf courses, and similar surfaces, to be usable in one hour after treatment.

In a preferred embodiment, the biological soil nutrient system is delivered to the soil by a hydro injection system that utilizes water to produce a high pressure aeration hole approximately ¼ by ½ inch wide and from 2-10 inches deep depending the setting and depth of root system in the soil. The penetrating force of the hydro injection system allows the insertion of the nutrients to the root system. The aeration is very temporary and the aeration holes close after a short time. The delivery system is currently available for use with the inorganic porous ceramic particles but the new use for the particles as a delivery vehicle for the biological soil nutrient system will revolutionize turf and lawn maintenance as well as enhance other agricultural soil nutrient processes.

The treatment area is prepared for aeration and the equipment is calibrated to the appropriate depth of the target root system. The amount of biological soil nutrient system material required is calculated as 50 lbs to 250 lbs per 1,000 square feet (sq. ft.). The hydro injection system is loaded with the amount of biological soil nutrient system for the treatment area and initiates delivery to the soil. The use of a hydro injection system is the preferred embodiment for delivery of the biological soil nutrient system.

Another embodiment of the delivery method, is a manual method of delivery using a spiked mechanism to produce the aeration holes. The biological soil nutrient system is placed into the holes by raking manually and is an effective method with smaller areas such as gardens and smaller lawns.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A biological soil nutrient system comprising:

a biological soil treatment composition comprising symbiotic fungi, symbiotic bacteria and at least one nutrient; and a plurality of porous ceramic particles having pores, the particles containing at least a portion of the composition within the pores, and wherein the symbiotic fungi of said composition are selected from the group consisting of *Glomus intraradices, Glomus mosseae, Glomus aggregatum, Glomus etunicatum* and mixtures thereof, and wherein the symbiotic bacteria of said composition are selected from the group consisting of *Bacillus licheniformis, Bacillus megaterium, Bacillus oleronius, Bacillus pumilis, Marinibacillus marinus, Paenibacillus lentimorbus* and mixtures thereof.

2. The biological soil nutrient system of claim 1, wherein the at least one nutrient is selected from the group consisting of at least one soil and plant nutrient, a biological nutrient, a biostimulant and combinations thereof.

3. The biological soil nutrient system of claim 2, wherein the at least one soil and plant nutrient is selected from the group consisting of a macro-nutrient, a micro-nutrient, a plant hormone, and combinations thereof.

4. The biological soil nutrient system of claim 2, wherein the biological nutrient is a carbohydrate.

5. The biological soil nutrient system of claim 2, wherein the biostimulant is humic acid.

6. The biological soil nutrient system of claim 1, wherein the plurality of porous ceramic particles include clay-based porous ceramic particles.

7. The biological soil nutrient system of claim 1, wherein at least a portion of the plurality of porous ceramic particles have a pore space capable of retaining both water and air.

8. The biological soil nutrient system of claim 1, wherein the symbiotic fungi and the symbiotic bacteria are 0.10% to 3.0% by weight of the plurality of porous ceramic particles.

9. The biological soil nutrient system of claim 1, wherein the plurality of porous ceramic particles have a particle porosity of 64 to 85 volume percent.

10. A process for preparing a biological soil nutrient system of claim 1 comprising:

a) contacting the plurality of porous ceramic particles with the biological soil treatment composition to form the biological soil nutrient system, wherein said contacting is carried out by spraying.

11. The process of claim 10, wherein the at least one nutrient of said composition is selected from the group consisting of at least one soil and plant nutrient, a biological nutrient, a biostimulant and combinations thereof.

12. The process of claim 11, wherein the at least one soil and plant nutrient is selected from the group consisting of a macro-nutrient, a micro-nutrients, a plant hormone, and combinations thereof.

13. The process of claim 11, wherein the biostimulant is humic acid and the biological nutrient is a carbohydrate.

14. A process for delivering a biological soil nutrient system to a treatment area comprising soil to treat roots of plants, comprising:

a) preparing the treatment area for aeration by producing aeration holes proximate to the roots of the plants in the soil of the treatment area; and b) inserting the biological soil nutrient system of claim 1 into said aeration holes to treat said roots of said plants, wherein said process is carried out manually by raking or hydro-injecting the biological nutrient system into the aeration holes of the soil.

* * * * *